MORIKUNI HASEBE,
TERUO FUKUDA,
HISATOMO FURUSAWA AND
HIRONORI MATSUBA,    INVENTORS

United States Patent Office 3,649,542
Patented Mar. 14, 1972

3,649,542
DIELECTRIC COMPOSITIONS FOR HIGH-VOLTAGE APPLICATION
Morikuni Hasebe, Teruo Fukuda, and Hisatomo Furusawa, Yokohama-shi, Kanagawa-ken, and Hironori Matsuba, Kawasaki-shi, Kanagawa-ken, Japan, assignors to The Furukawa Electric Company Limited, Tokyo, Japan
Filed Jan. 22, 1969, Ser. No. 793,069
Claims priority, application Japan, Jan. 22, 1968, 43/3,581
Int. Cl. C08f 45/62; H01b 3/18
U.S. Cl. 252—63.5                             3 Claims

ABSTRACT OF THE DISCLOSURE

Plastic dielectric compositions, specifically useful for high-voltage insulation, said composition containing a resin as the major component and a minor amount of an organic compound partially compatible with the resin, which organic compound is converted into a substance having a surface resistivity of less than $10^{12}\Omega$ when exposed to electrical discharges. Insulation produced from such compositions are stable over a long period of time at high voltages.

DETAILED DESCRIPTION OF THE INVENTION

Figure 1:
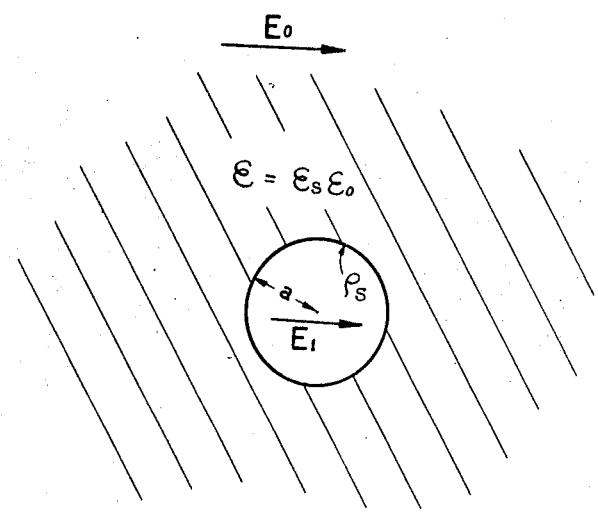
FIG. 1 shows the relation between the electric field strength in dielectrics themselves and that in a void enclosed in the dielectrics.

The present invention relates to dielectric compositions and high-voltage electric apparatus in which voltage between conductors is over 3 kv., and which have a high resistance against partial discharge and maintain a high dielectric strength for a long period.

Recently, several kinds of plastics have been used as electric insulating materials in various electrical fields. In particular, olefin high-polymers, such as polyethylene, due to their good mechanical properties and workability together with excellent electrical properties, have been widely used as insulating materials in various electrical apparatuses in the form of a composition with various fillers as required, either in cross-linked state or in non-cross-linked state. However, when used as insulation for high voltage electrical apparatuses, such as electric cables, cable joints and terminals, bushings and transformers where a high voltage over 3 kv. is applied between conductors, the insulating material, though having a high theoretical dielectrical strength, occasionally breaks down at a lower voltage, so it has been necessary to operate such apparatus at a relatively low voltage, for example below the corona starting voltage which is much lower than the theoretical electrical breakdown voltage inherent to the insulating material.

In recent years, investigations of insulation breakdown have revealed that the electrical breakdown under a high voltage of plastic insulations start from a local breakdown of the insulation developed by electric discharges at the local defects, such as tiny voids inevitably formed in the insulation at the time of extrusion, local defects resulting from intruision and contamination by foreign matters such as metallic particles and dust introduced therein by some reason, or small gaps beween the insulation layer and the adjacent conductive layer.

Among these local defects, however, the small gaps between the conductive layer and the adjacent insulating layer can be eliminated by sticking them fast at the stage of manufacture, and the problem of the impurities can be overcome by deliberate treatment during manufacture, but the tiny voids existing in the insulating layer cannot completely be eliminated by the technique now used for plastic extrusion. Moreover, partial discharges, taking place in the tiny voids while the voltage is being applied, gradually attack the insulation surface of the voids until partial breakdown called "tree" leads to the dielectric breakdown. Thus, it is very important to prevent the insulation breakdown due to the tiny voids.

For the maintenance of a high-voltage electric apparatus, such as high-voltage electric power cables in which such plastic insulation compositions are used, extensive investigations have recently been carried out to protect the insulation from breakdown due to electric discharges even if they occur in the voids which exist in the insulation, namely, to improve the corona resistance of the insulation.

One of such solutions is to develop an electrical insulating material which has a certain corona resistance, but such material has not yet been found. Another solution is to prevent partial breakdown called "tree" in the insulating layer which is made of conventional high-polymer material by adding some suitable additives, for example, by mixing diphenyl-p-phenyleneguanidine to a polyethylene composition which produces an insulation having a good resistance to "tree." (Power Apparatus and Systems, June, pp. 112–121 (1962).)

Further, another solution is to use a mixture of a conventional electrical insulating composition and liquid substances, such as paraffin and alkyl benzene having substantially the same dielectric constant as the insulating composition, which exude and fill the voids inevitably formed in the insulation to suppress the electric discharge that may occur in the voids (British Pat. 1,028,110). This methods, however, has not been applied in practice because of much difficulties involved.

On surveying the problems of breakdown of the insulation used in high-voltage electric apparatus which is composed of an insulation made of plastic insulating materials as cited above, the present inventors have found that it is effective, in order to avoid the insulation breakdown, to reduce the electric field strength in the voids, of which the breakdown voltage is fairly low in comparison with that of the insulation, for the purpose of preventing discharges, that is, to decrease the surface resistivity of inside surface of the voids, and therefore reduce drop in the corona starting voltage in the voids.

Further, the present inventors have especially investigated as to what extent the surface resistivity should be decreased on the surface of the voids and how to do it.

In the theoretical treatment of suppression of the discharge that may occur particularly in the voids, the inventors assumed a spherical void of diameter in the dielectrics as shown in FIG. 1 and the following equation for the strength of electric field $E_1$ in the spherical void was derived, $$E_1 = \frac{3E_0}{\sqrt{\left(\frac{1}{\epsilon_s}+2\right)^2 + \left(\frac{2}{\omega\epsilon_s\epsilon_0 a\rho_s}\right)^2}} \quad (1)$$

where $E_0$ is the electric field strength in the insulation varying in the sinusolidal form with respect to time with angular frequency $\omega$, $\epsilon_s$ is the specific inductive capacity of the dielectrics, $\epsilon_0$ is dielectric constant in the spherical void and $\rho_s$ is the surface resistivity of the spherical void wall (the equation is expressed in the M.K.S. unit system).

The specific inductive capacity $\epsilon_s$ of plastic generally used for electric insulating material is 2–5, and the diameter of the voids in the insulation is at most 1 mm. Assuming that the specific inductive capacity of the insulating material is 2.2, that the insulation made from the above insulation material has spherical voids of 1 mm. in diameter, and that the frequency of electric field strength in the insulation is 50 Hz., the ratio of the electric field strength in the spherical voids $E_1$ to that in the insulation $E_0$ is given by the curve in FIG. 2 as a function of $\rho_s$.

Figure 2:
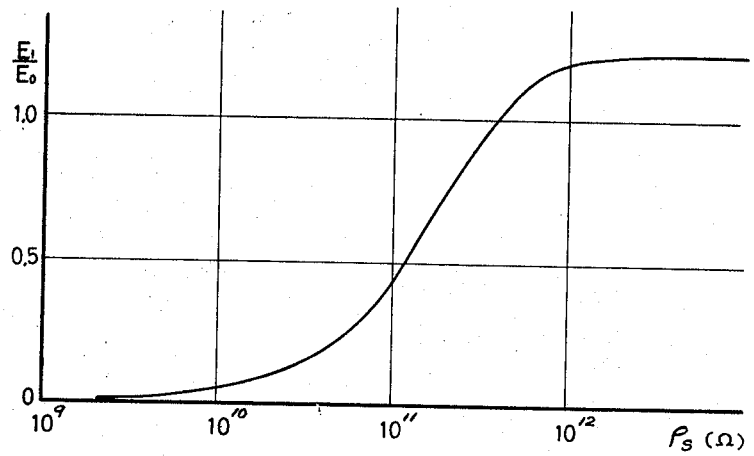
FIG. 2 shows the relation between the ratio of the field strength and the resistivity of the void surface.

As seen in FIG. 2, the value of $E_1$ begins to drop when the specific resistance $(\rho)$ of the surface of the voids is in the neighborhood of $10^{12}\Omega$ and the value at $10^{12}\Omega$ lowers to 0.36 time as much at $10^{11}\Omega$ and 0.036 time at $10^{10}\Omega$. Therefore, by reducing the surface resistivity of the spherical voids $E_1$ can be made very small, and thus discharge in the voids can be prevented. In the above calculation, however, a diameter of 1 mm. was given to each void, but actual voids mostly have a smaller diameter so that $E_1$ obtained from Eq. 1 will be even smaller than the above values. In addition, since the values $\epsilon_s$ of different insulation materials do not differ much from one another, $E_1$ will vary little.

Thus the present inventors have concluded that partial discharge can be prevented in any insulation materials, if the surface resistivity of the voids is kept below $10^{12}\Omega$.

On the other hand, if insulation materials have a volume resistivity below $10^{10}\Omega$ cm. for an A.C. of 50 Hz., the conductive current will be larger than the displacement current and such materials actually cannot be considered as insulation materials. These materials are not applicable for high-voltage insulation because they are less effective to reduce the electric field ($E_1$) in the voids and also they have large dielectric loss.

Based upon the above conclusion, the inventors have found that the desired object can be attained when the surface resistivity of the voids formed in the insulation layers or the surface resistivity of the gap surface between insulation layer and conductive layer is kept below $10^{12}\Omega$ and the volume resistivity above $10^{10}\Omega$ cm., and the inventors further investigated practical methods therefor. Thus, it has been found that if some organic compounds are mixed with a composition in which a resin is the major constituent and the mixture is applied on an electric conductor to form an insulation layer, those organic additives bleed out and form a thin layer within a few hours or a few days. Thus bleeding phenomenon occurs on all surfaces of the insulation as well as on the inside surfaces of voids. When a voltage is applied between conductors under such conditions, discharges take place locally at the defective portions of the insulation such as in the voids and in the air gaps between the insulation and the conductors. Consequently, the organic compounds which have bled out at the local defective parts are converted into substances having a surface resistivity of less than $10^{12}\Omega$ by the oxidizing action of ozone produced by these discharges. Therefore, for the reason previously mentioned, partial discharges at the defective portion of the insulated conductor are suppressed for a long time or, in other words, the insulation breakdown due to discharges is suppressed.

Although in the present invention, the organic substances mixed with the resin composition bleed out at all interfaces of the insulating layer made from the composition, only a part of the organic compounds that exist at the points where partial discharges may occur, such as at voids in the insulation and the air gaps produced along the interface with electric conductors, are subjected to the chemical change by the partial discharges and converted into substances having a surface resistivity of less than $10^{12}\Omega$. In this way, any possible unfavorable effects of the organic compounds, such as decrease in the volume resistivity of the insulation layer, are scarcely observed in other parts of the insulation where no partial discharges occur.

In arriving at the previously mentioned bleeding phenomenon, various experiments were made, in which organic compounds having the above-mentioned desirable characteristics, were added to various electrical insulating resin compositions containing thermoplastic resins or thermosetting resins as major constituents therein. These resins may contain other conventional additives such as fillers, stabilizers, plasticizers, cross-linking agents, cross-linkage accelerators, hardening agents, etc. in the required amounts. From such compositions insulation layers for high-voltage electric apparatuses of over 3 kv. were produced. These insulating materials possess several advantages, such as that the addition of the organic compounds scarcely deteriorate the electrical or physical properties of these insulators. Further, it has been observed that the partial discharge starts to a small extent in these organic compound-containing insulators, but disappear within about 30 minutes. This is true even if such voltage is applied to these insulators as would normally cause a lasting partial discharge to conventional insulation.

As mentioned above, the present invention comprises adding to a resin-containing composition useful for electrical insulation, one or more organic compounds which have some compatibility with plastics and are converted by corona discharges into substances having a surface resistivity of less than $10^{12}\Omega$ and then forming the composition into an insulation layer for high-voltage apparatus by extrusion moulding or casting or in the form of tape to be wound on conductors, or by any other suitable means. As the result of so constructing the insulation layer, even if there exist partial defects, such as air gaps at the interface of the insulation, or tiny voids in the insulation, the added organic compounds having the above-mentioned properties present at the defective parts and when an electric voltage is applied, these organic compounds are converted by the action of partial discharges into substances having a surface resistivity less than $10^{12}\Omega$ in a relatively short time on the surface of the defective parts. This phenomenon suppresses the occurrence of partial discharges so that the resistance to breakdown due to high voltage is maintained for a long period.

Further advantages of the present invention reside in the fact that the organic comopunds having the above-mentioned properties are not so compatible with the resin composition that they will remain in the composition for a long period of time, yet are capable of being initially mixed homogeneously in the resin composition at a temperature above the melting point of the organic compounds. By exhibiting these characteristics, the organic compounds seep out of the composition with the passage of time, thus forming a thin layer on the surface of the inner or interfacial defective part of the insulation. Even if the abovementioned first deposit is removed by some cause, the remaining organic compounds in the composition further deposit at the defective parts of the insulation and, when subjected to partial discharges are converted, in a short time, into a layer of substance having a surface resistivity of less than $10^{12}\Omega$. Thus an electric apparatus, using the insulation layer made from the dielectric composition of the present invention has a very high stability in use for a long time.

The organic compounds having the required properties mentioned above are as follows:

(1) Thiuram compounds having the following general formula:

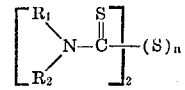

where $R_1$, $R_2$ are alkyl, aryl or alkylene groups having the same or different number of carbon atoms of alkylene groups which form a closed ring with a nitrogen atom to which they are combined, $n$ is a positive integral number, such as tetramethyl thiuram monosulfide, tetraethyl thiuram monosulfide, tetra-n-propyl thiuram monosulfide, tetra-n-butyl thiuram monosulfide, tetra-n-amyl thiuram monosulfide, tetramethyl thiuram disulfide, tetraethyl thiuram disulfide, tetra-n-propyl thiuram disulfide, tetra-n-butyl thiuram disulfide, tetra-n-amyl thiuram disulfide, dimethyl-diphenyl thiuram disulfide, tetramethyl thiuram tetrasulfide, tetraethyl thiuram tetrasulfide, tetra-n-propyl thiuram tetrasulfide, tetra-n-butyl thiuram tetrasulfide, tetra-n-amyl thiuram tetrasulfide and dipentamethylene thiuram tetrasulfide;

(2) Metallic salts of carbamic acid having the following general formula:

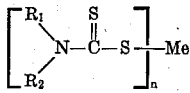

where $R_1$ and $R_2$ are alkyl, aryl or alkylene groups having the same or different numbers of carbon atoms or alkylene groups which form a closed ring with a nitrogen atom to which they are combined, Me is a metallic atom such as sodium, cobalt, nickel, selenium, tellurium, cadmium, etc. excluding zinc, copper, lead and iron, and $n$ is a positive integral number which is determined by the valency of the metal such as sodium dimethyldithiocarbamate, sodium diethyldithiocarbamate, sodium di-n-butyldithiocarbamate, nickel dibutyldithiocarbamate, nickel dimethyldithiocarbamate, nickel diethyldithiocarbamate, nickel di-n-propyldithiocarbamate, cobalt diethyldithiocarbamate, nickel n-pentamethylenedithiocarbamate and bismuth dimethyldithiocarbamate;

(3) Metallic salts of xanthogenic acid having the following general formula:

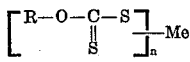

where R is alkyl, aryl or alkylene group, Me is a metallic atom such as nickel, zinc, copper, cobalt, selenium, tellurium, cadmium, etc., and $n$ is a positive integral number which is determined by the valency of the metal. Examples of these metallic salts are butylxanthanate, zinc methylxanthate, zinc ethylxanthate, cobalt ethylxanthate, cobalt methylxanthate, cobalt butylxanthate, nickel ethylxanthate, nickel methylxanthate, nickel butylxanthate, nickel n-propylxanthate, selenium butylxanthate and tellurium butylxanthate;

(4) Mercaptoimidazolines such as 2-mercaptoimidazoline;

(5) Condensate products of aldehyde-aniline such as acetoaldehyde-aniline and butylaldehyde-aniline;

(6) Nnitrogen-containing cyclic compounds such as pyridine, 2,3,5,6-tetrachloropyridine, quinoline, trimethyldihydroquinoline polymer, 6 - ethoxy - 2,2,4 - trimethyl-1,2-dihydroquinoline and carbazole;

(7) Aromatic amine derivatives such as the reaction product of diphenylamine with acetone, β-naphthylamine, N,N'-diphenylethylenediamine, and 2-nitrodiphenylamine; and (8) Phenols such as styrenated phenol.

As for the amount of the aforementioned organic compounds to be added in the resin composition, an amount of less than 0.01% by weight has been found to be insufficient for present purposes, while an amount over 10% by weight leads to excessive deposition over the entire interface of the insulation and this increased amount exhibits little or no advantages and is expensive. It is thus desirable to use an amount of 0.01–10% and preferably 0.02–5.0% by weight of the organic compound.

The resin compositions used for the dielectric composition of the present invention consist of thermoplastic resins, such as high density polyethylene, low density polyethylene, ethylene-metallic salts of acrylic acid copolymers, ethylene-ethylacrylate copoymers, ethylene-vinyl-acetate copolymers, polypropylene, polystyrene, polycarbonate and polysulfone, and thermosetting resins such as epoxy resins, unsaturated polyester resins, polyphenylene oxide and silicone resins; and one or more additives selected from rubber-like substances, cross-linking agents such as organic peroxides, fillers such as talc, hard clay, calcium carbonate and carbon black, plasticizers such as dioctylphthalate, stabilizers, oxidation preventors, coloring agents such as pigment, and in the case of thermosetting resins, hardeners such as amines and acid anhydrides.

Example 1

To the resins shown in Table 1, the organic compounds listed in Table 2 were each added in amounts of 1.0% by weight, and the thus-prepared compositions were mixed thoroughly on rolls. From these compositions, sheets of 100 mm. by 100 mm. in size and of 1 mm. in thickness were prepared by press forming. Each sheet was kept at room temperature for 100 hours, and then two circular aluminum foils, one 40 mm. in diameter and the other 60 mm., were attached with Vaseline concentrically on both sides of the sheet to serve as electrodes to which a sinusoidally alternating voltage 10 kv. was applied for 1 hour at normal temperature and humidity, and the discharge caused between the ends of electrodes was applied to a part of the sheet. Then the surface resistivity as well as the volume resistivity of the sheet were measured with the distance between the two electrodes being made 2 mm. and D.C. voltage 500 v. being applied between the electrodes.

The results obtained are shown in Table 1.

TABLE 1

| Base resins | Organic compound added (in number*) | Surface resistivity of the sheet | | Volume resistivity of the sheet, after discharge |
|---|---|---|---|---|
| | | Before discharge | After discharge | |
| Polyethylene (specific gravity 0.92, MI 1.0) | None | $>10^{15}\Omega$ | $3.0\times10^{15}\Omega$ | $>10^{16}\Omega$-cm. |
| | 1 | $>10^{15}\Omega$ | $6\times10^{10}$–$2\times10^{11}\Omega$ | $>10^{16}\Omega$-cm. |
| | 2 | $>10^{15}\Omega$ | $7\times10^{10}$–$6\times10^{11}\Omega$ | $>10^{16}\Omega$-cm. |
| | 3 | $>10^{15}\Omega$ | $6\times10^{11}$–$1\times10^{12}\Omega$ | $>10^{16}\Omega$-cm. |
| | 4 | $>10^{15}\Omega$ | $2\times10^{10}$–$4\times10^{10}\Omega$ | $>10^{16}\Omega$-cm. |
| | 5 | $>10^{15}\Omega$ | $3\times10^{11}$–$8\times10^{11}\Omega$ | $>10^{16}\Omega$-cm. |
| Ethylene-sodium acrylate copolymer (10% sodium acrylate). | 1 | $>10^{15}\Omega$ | $3\times10^{11}$–$7\times10^{11}\Omega$ | $>10^{14}\Omega$-cm. |
| | 2 | $>10^{15}\Omega$ | $8\times10^{10}$–$3\times10^{11}\Omega$ | $>10^{14}\Omega$-cm. |
| Ethylene-ethylacrylate copolymer (20% ethyl acrylate). | 2 | $>10^{15}\Omega$ | $4\times10^{10}$–$9\times10^{11}\Omega$ | $>10^{14}\Omega$-cm. |
| | 5 | $>10^{15}\Omega$ | $1\times10^{10}$–$8\times10^{11}\Omega$ | $>10^{14}\Omega$-cm. |

*Refer to Table 2.

TABLE 2

Organic compounds added (1) Tetraethyl thiuram disulfide
(2) Nickel dibutyldithiocarbamate
(3) Nickel butylxanthate
(4) Nickel ethylxanthate
(5) β-Naphthylamine It was confirmed, as is evident in Table 1, that in any sheet made of the compositions to which organic compounds have been added, the organic compounds deposited on the surface were rapidly converted, when exposed to the discharge, into substances having the surface resistivity of less than $10^{12}\Omega$.

Example 2

In order to produce polyethylene insulated electric power cables, stranded soft copper conductors with 100 mm.² cross-section were covered with a 1.0 mm. thick layer of conductive polyethylene as the internal conductive layer which was covered with a 8.0 mm. thick insulation layer made of a composition of polyethylene (specific gravity 0.92, MI 2.0) mixed with 0.5% by weight of nickel dibutyldithiocarbamate, then with a 1.5 mm. thick layer of conductive polyethylene as the external conductive layer, both layers being formed by the extrusion covering method. Further, the outside was covered successively with 0.15 mm. thick screening layer of copper tape. 0.25 mm. thick layer of cotton tape, and 2.0 mm. thick sheath of polyvinyl chloride composition. When voltage was applied to the conductors to determine the corona starting voltage, a partial discharge of about 10 picocoulombs was observed at 28 kv., but the discharge disappeared when the voltage was maintained for about 15 minutes. Next, when the voltage was raised to 38 kv., partial discharge of about 20 picocoulombs occurred which disappeared as before in about 20 minutes.

The dielectric loss measured with this cable was 0.0006. Further, to measure the long-period breakdown voltage, at first A.C. voltage 60 kv. of commercial frequency was applied for 1 hour and then stepped up at a rate 10 kv. per hour. Breakdown took place when 230 kv. was applied for 40 minutes.

Example 3

A 22 kv. polyethylene insulated electric power cable having the same construction as in Example 2 was prepared in the same manner with a polyethylene composition which was a mixture of polyethylene (specific gravity 0.92, MI 2.0) and 4.0% by weight of zinc n-butylxanthate. The polyethylene insulated electric power cable thus prepared was allowed to stand for 2 days, then voltage was applied as in Example 2 to measure the corona starting voltage. A partial discharge of about 8 picocoulombs was observed at 28 kv. which, however, disappeared when the voltage was maintained for about 20 minutes. Furthermore, when the cable, after being left as it was for some days, was again given a voltage of 28 kv., there occurred no partial discharge but the further increase of voltage to 38 kv. gave rise to a partial discharge of about 25 picocoulombs, which disappeared in about 15 minutes.

The dielectric loss and the long-period breakdown voltage of the cable, measured in the same way as shown in Example 2, were 0.00065 and 190 kv. respectively.

Example 4

Stranded soft copper conductors of 18.2 mm. outer diameter were covered with a 0.8 mm. thick layer of conductive polyethylene composition, to which dicumyl peroxide had been mixed as cross-linking agent, and then covered by extrusion at the extrusion temperature of 120° C. with a 5.0 mm. thick layer of polyethylene composition in which 2.0% by weight of tellurium n-pentamethylenedithiocarbamate and 2.8% by weight of dicumyl peroxide had been added to polyethylene (specific gravity 0.92, MI 3.0), and immediately thereafter introduced into a continuous vulcanization tube filled with 200° C. steam for 4 minutes to form cross-linked polyethylene insulated wire core by cross-linking both in the conductive and in the insulation layers. Subsequently the core was covered with successive layers of conductive polyethylene, conductive cloth tape, soft copper tape, cotton tape, and a sheath of polyvinyl chloride composition to complete 10 kv. cross-linked polyethylene insulated electric power cables.

This cable was allowed to stand for 3 days and, when a voltage of 18 kv. was applied, a partial discharge of 4 picocoulombs occurred at first but disappeared in about 3 minutes. After being left as it was for 10 days, the cable was again given a voltage of 18 kv., but there occurred no discharge. Subsequently when the voltage was raised to 28 kv., a discharge of about 10 picocoulombs occurred but completely disappeared in about 20 minutes.

The long-period breakdown voltage of this cable was measured, as in Example 2. The breakdown took place when 150 kv. was applied for 5 minutes.

Example for comparison

A 22 kv. polyethylene insulated electric power cable for use having the same construction as in Example 2 was prepared by the same process, using polyethylene (specific gravity 0.92, MI 3.0) to which no organic compounds of the present invention had been added. When a voltage of 28 kv. was applied to the cable partial discharges occurred and remained even after the lapse of 60 minutes.

In the experiment to measure the long-period breakdown voltage, as in Example 2, of the present cable, breakdown took place when 150 kv. was applied for 9 minutes.

Example 5

From a homogeneous mixture of polycarbonate resin with 1.0% by weight of carbazole, sheets of the size 100 mm. by 100 mm. and 1 mm. thick were prepared. The sheets thus prepared were subjected to discharge as in Example 1, and it was found that the surface resistivity of over $10^{15}\Omega$ before discharge decreased to $2\times 10^{11}\Omega$ after discharge.

Example 6

An epoxy resin composition consisting of 100 parts by weight of epoxy resin (commercial name: Epon 828) obtained by condensation of bisphenol A with epichlorohydrin, 100 parts by weight of hexahydrophthalic acid anhydride as hardening agents, and 2.0 parts by weight of 2-mercaptoimidazoline, thoroughly mixed together was made into a bushing by forming a 8.0 mm. thick insulation layer on a conductor to which semiconductive layer of conductive rubber had been provided beforehand. In the experiment to measure the corona starting voltage of the bushing, a partial discharge of 5 picocoulombs was observed at 30 kv., but it disappeared in 10 minutes. The voltage was increased to 40 kv., a partial discharge of 15 picocoulombs occurred, but disappeared in 15 minutes.

For the purpose of examining the long-period breakdown voltage of the bushing, A.C. voltage 60 kv. of the commercial frequency was applied for 1 hour at first, and the voltage was stepped up at the rate of 10 kv. per hour until the insulation layer was broken. Actually the breakdown took place when 260 kv. was applied for 10 minutes.

For comparison, the same test as in Example 6 was conducted with the bushing prepared from a composition in which 2-mercaptoimidazoline had not been added. Partial discharges occurred when a voltage of 30 kv. was applied, and remained even after the lapse of 60 minutes. In the long-period breakdown voltage measurement, the actual breakdown took place when 160 kv. was applied for 7 minutes.

As has been mentioned in detail, the dielectric compositions of the present invention can be used for electric insulations which have high resistance to partial discharges and maintain good insulation for a long period, therefore the high-voltage electric apparatus insulated with the dielectric compositions of the present invention maintain a stable performance for a long period and are usable at a higher voltage than those insulated with any other conventional dielectric composition.

What is claimed is:

1 A dielectric composition for high-voltage insulation, comprising polyethylene or copolymers of polyethylene as the major constituent and 0.01–10.0% by weight of one or more metallic salts of xanthogenic acid and having the following general formula:

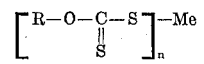

where R is an alkyl, aryl or alkylene group, Me is a metallic atom and $n$ is a positive integral number which is determined by the valency of the metal, said metallic salts being converted when exposed to electric discharges into substances having a surface resistivity of less than $10^{12}\Omega$.

2. A dielectric composition according to claim 1 in which the metallic salt of xanthogenic acid is the nickel salt thereof.

3. A dielectric composition according to claim 2 in which the nickel salt is at least one member selected from the group consisting of a nickel butyl-xanthate, nickel methyl-xanthate, nickel n-propyl-xanthate, and nickel ethyl-xanthate.

References Cited

UNITED STATES PATENTS

| | | | |
|---|---|---|---|
| 2,934,683 | 4/1960 | Durst et al. | 252—63.5 X |
| 3,075,040 | 1/1963 | Lemmerich et al. | 174—110 |
| 3,318,841 | 5/1967 | Tomlinson et al. | 260—45.75 |
| 3,350,312 | 10/1967 | Gross et al. | 252—63.2 |
| 3,420,778 | 1/1969 | Heidt | 252—63.7 |
| 3,462,517 | 8/1969 | Hansen et al. | 260—897 |
| 3,483,239 | 12/1969 | Hurlock et al. | 260—439 |

HAROLD ANSHER, Primary Examiner

R. A. DAWSON, Assistant Examiner

U.S. Cl. X.R.

174—110 PM, 110 SR; 252—63.2, 63.7; 260—45.7 R, 45.75 N